United States Patent [19]

Klarenbach et al.

[11] Patent Number: 4,669,639

[45] Date of Patent: Jun. 2, 1987

[54] DISPENSING AND SAFETY VALVE ASSEMBLY FOR USE IN SYPHONS AND THE LIKE

[75] Inventors: Hans W. Klarenbach, Haan; Herbert Schmitz, Kreuz-au, both of Fed. Rep. of Germany

[73] Assignee: Heimsyphon GmbH, Solingen, Fed. Rep. of Germany

[21] Appl. No.: 734,904

[22] Filed: May 16, 1985

[30] Foreign Application Priority Data

May 26, 1984 [DE] Fed. Rep. of Germany ....... 3419736

[51] Int. Cl.$^4$ .............................................. B65D 83/14
[52] U.S. Cl. ............................... 222/396; 222/402.15; 222/402.22; 137/512.2; 137/542
[58] Field of Search .............. 222/396, 402.22, 402.23, 222/402.15; 137/512.2, 541, 542; 251/353, 354

[56] References Cited

U.S. PATENT DOCUMENTS

| | | | |
|---|---|---|---|
| 2,051,100 | 8/1936 | Nelson | 137/542 X |
| 2,612,293 | 9/1952 | Michel | 222/402.23 X |
| 2,909,192 | 10/1959 | Dobrick | 137/542 |
| 3,081,919 | 3/1963 | Samuel | 222/396 |
| 3,267,959 | 8/1966 | Savage | 137/541 X |
| 3,272,404 | 9/1966 | Graves et al. | 222/396 |
| 3,520,368 | 7/1970 | Hayes | 222/396 UX |
| 3,578,788 | 5/1971 | Potter et al. | 222/396 X |
| 3,666,148 | 5/1972 | Webster | 222/396 |

*Primary Examiner*—Joseph J. Rolla
*Assistant Examiner*—Frederick R. Handren
*Attorney, Agent, or Firm*—Peter K. Kontler

[57] ABSTRACT

A combined dispensing and safety valve for use in syphons for foamed cream has a housing which constitutes a cover for the bottle of the syphon and receives a tiltable or reciprocable valving element of the dispensing valve. This valving element has an axial passage for the reciprocable valving element of the safety valve which opens when the pressure in the bottle reaches a preselected threshold value. The axial passage has a smaller-diameter section for the shank and a larger-diameter section for the head of the valve element of the safety valve. The seat for the valving element of the safety valve can be defined by a detachable cup of the valving element of the dispensing valve or by the surface surrounding the smaller-diameter section of the axial passage. The valving element of the safety valve is biased to its operative position by a coil spring which is installed in the larger-diameter section of the axial passage. The shank of the valving element of the safety valve carries an annular seal which contacts the internal surface of the valving element of the dispensing valve in the smaller-diameter section of the axial passage, at least while the safety valve is closed.

14 Claims, 8 Drawing Figures

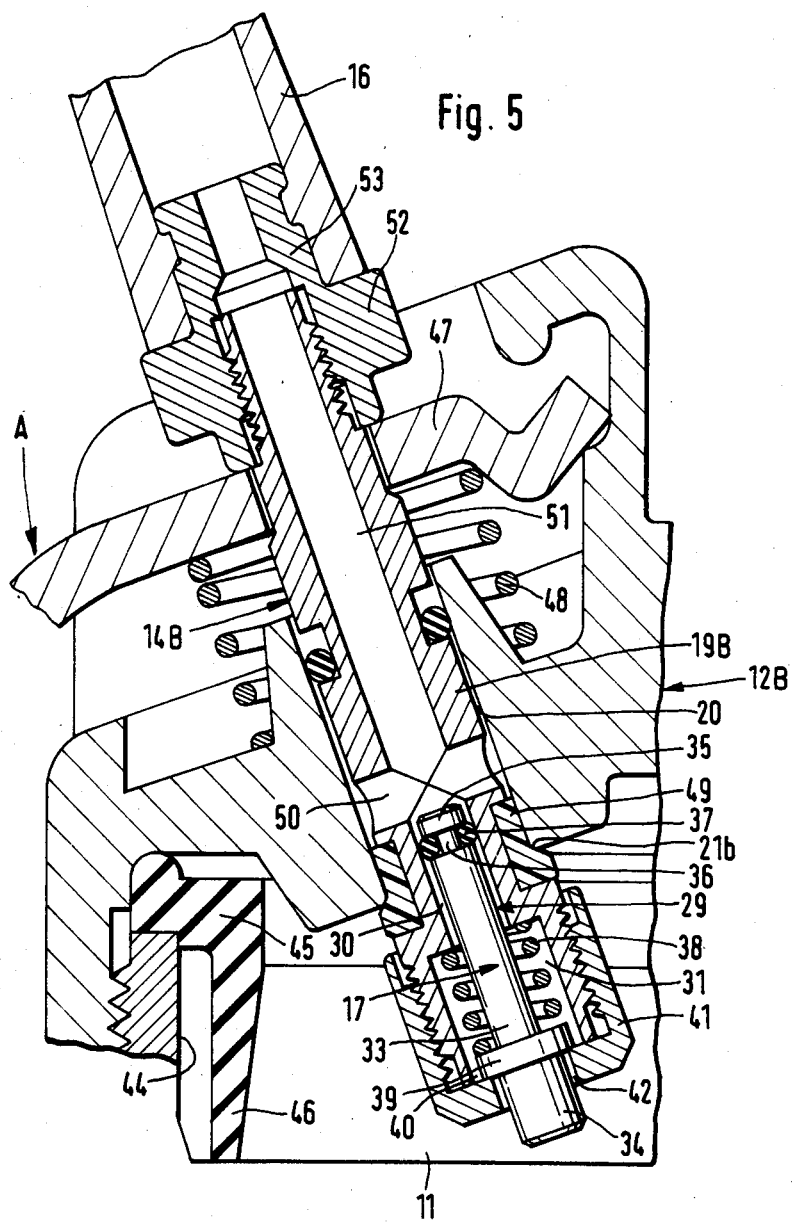

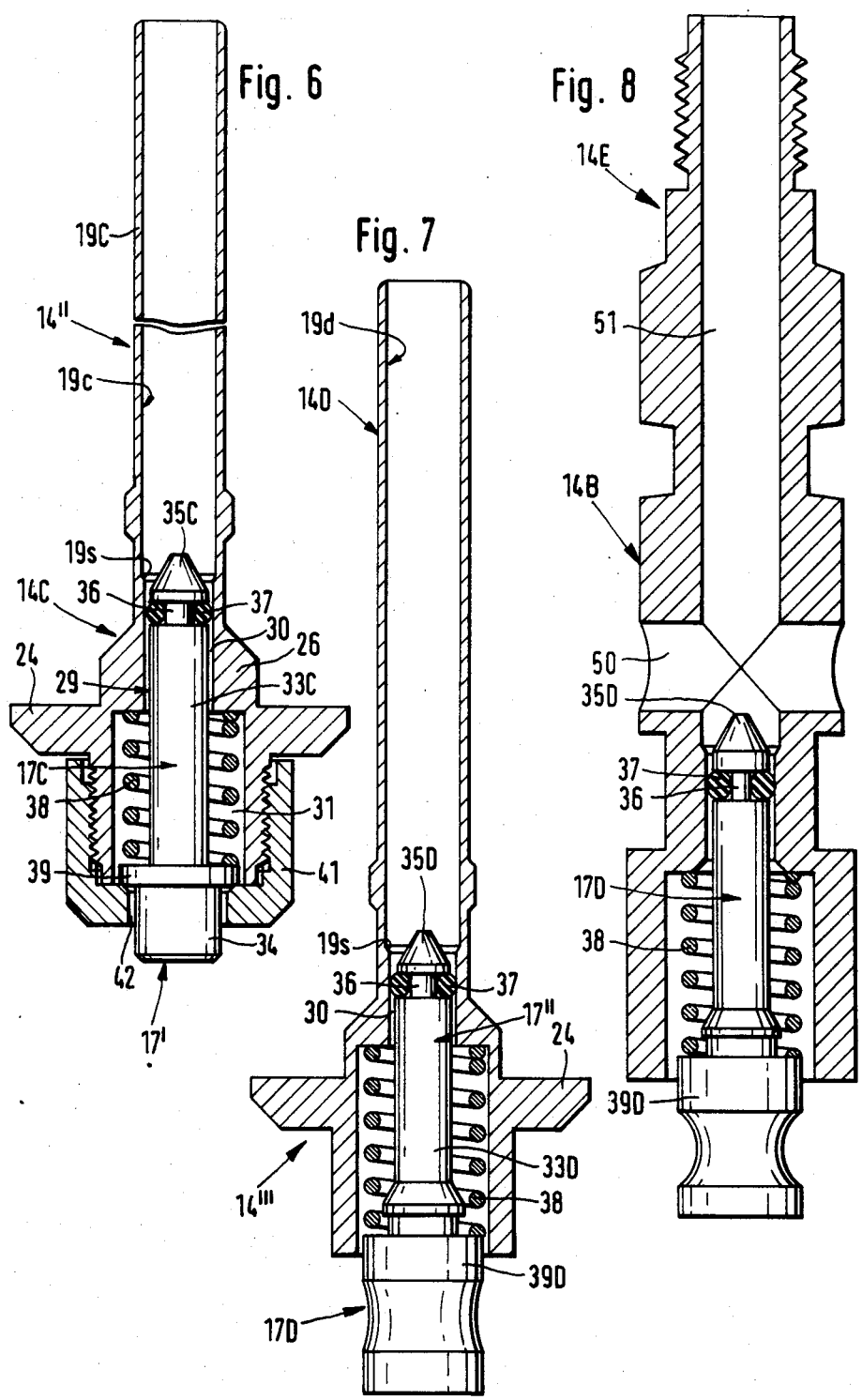

DISPENSING AND SAFETY VALVE ASSEMBLY FOR USE IN SYPHONS AND THE LIKE

BACKGROUND OF THE INVENTION

The present invention relates to valves in general, and more particularly to improvements in valves which can be utilized in syphons or the like. Still more particularly, the invention relates to improvements in valves which can be utilized for dispensing confined pressurized flowable media, such as cream, and for ensuring that the pressure of the confined media does not rise beyond a permissible value.

It is already known to install a dispensing valve in the cover or cap of a syphon which contains a supply of pressurized cream or another flowable medium and to provide the cap with a safety valve which opens as soon as the pressure in the interior of the syphon exceeds a preselected threshold value. The dispensing valve can be actuated by a so-called metering pin which can be tilted by the operator and is normally confined in a tubular body, or by a spring-biased lever which is pivotally secured to the cover. The utilization of two discrete valves, namely a dispensing valve and a safety valve, often presents problems because such valves occupy too much space in and/or on the cover. Moreover, two discrete valves contribute to the cost of the device wherein the valves are installed, and the manipulation of the dispensing valve can interfere with the operation of the safety valve.

Attempts to overcome the aforediscussed drawbacks of conventional two-piece dispensing valve-safety valve combinations include the provision of an assembly including a dispensing valve with a built-in safety valve. Heretofore known valve assemblies of such type are not entirely satisfactory, not only because they are complex, overly sensitive, bulky and expensive but also because they can be used only if the dispensing valve is to be actuated by a lever. In all devices wherein the dispensing valve is actuated by a pivotable or similarly movable metering pin, the safety valve invariably constitutes a discrete part which must be installed independently of and occupies space in addition to that occupied by the dispensing valve. Moreover, presently known assemblies wherein the dispensing and safety valves constitute a self-sustaining unit cannot be installed in existing syphons or like devices in lieu of a pair of discrete (dispensing and safety) valves.

OBJECTS AND SUMMARY OF THE INVENTION

An object of the invention is to provide a novel and improved valve assembly wherein the dispensing and safety valves are combined in such a way that they occupy little room and that the dispensing valve can be actuated by a metering pin, by a lever or in another suitable way.

An additional object of the invention is to provide a novel and improved safety valve for use in the above outlined assembly.

Still another object of the invention is to provide a novel and improved dispensing valve for use in the above outlined assembly.

A further object of the invention is to provide a syphon which embodies the above outlined valve assembly.

Another object of the invention is to provide a novel and improved cover which can be used in syphons or the like and embodies or carries the aforediscussed valve assembly.

An additional object of the invention is to provide a dispensing valve-safety valve assembly which can be installed in existing syphons and like devices as a superior substitute for heretofore known combinations of such valves.

The invention is embodied in a unitary dispensing and safety valve assembly which can be used with particular advantage in syphons for controlled dispensing of pressurized cream or other flowable media. The improved assembly comprises a housing (such housing can form part of or can constitute the detachable cover of a syphon) which serves to confine a supply of pressurized medium and has a first seat which defines a path for evacuation of the confined flowable medium from the interior of the housing, a first valving element which normally engages the seat to prevent the escape of the confined flowable medium from the interior of the housing and has a medium-discharging passage including a first section and a second section, a second seat provided in the valving element (e.g., in the region of the second section), means for displacing the valving element relative to the first seat to thus permit the escape of confined medium from the housing along the aforementioned path, a second valving element which includes a shank extending into the first section of the passage and a head which is disposed in the second section of such passage, and a coil spring or other suitable biasing means provided in the second section of the passage and serving to yieldably urge the head to at least one first position in which the second valving element sealingly engages the second seat to thus prevent the escape of the confined flowable medium from the interior of the housing by way of the passage. The head is displaceable by the confined medium against the opposition of the biasing means when the pressure of the confined medium exceeds a predetermined value so that the second valving element then assumes a second position in which the medium can escape from the housing by way of the aforementioned passage.

The shank of the second valving element can include a portion (e.g., an annular seal which is recessed into a circumferential groove of the body of the shank) which is in sealing contact with the surface surrounding the first section of the passage in the first valving element, at least while the head or another part (such as the seal) of the second valving element engages the second seat. The capacity (and especially the diameter) of one of the two sections of the passage is preferably larger than the capacity of the other section. For example, the first section can constitute the smaller-diameter portion and the second section can constitute the larger-diameter portion of a stepped bore which constitutes the passage in the first valving element.

In accordance with one embodiment of the invention, the first valving element is reciprocable with reference to the housing toward and away from engagement with the first seat, and the displacing means then comprises a handle (e.g., a spring-biased lever which is pivotable relative to the housing) which is actuatable (e.g., by hand) to move the first valving element away from engagement with the first seat. If the first valving element is arranged to swivel into and from engagement with the first seat, the displacing means can comprise a tubular member which defines a second passage in communication with the aforementioned path. The tubular member is actuatable to tilt or swivel the first valving element away from engagement with the first seat. Such first valving element can include an elongated portion which can be said to constitute a metering pin and extends into the tubular member of the displacing means.

The shank of the second valving element can include a conical end portion which is remote from the head and is preferably adjacent to the aforementioned annular seal.

The first valving element can include a detachable portion which defines the second seat. Such detachable portion can include or constitute a threaded cap which serves to confine at least a portion of the head in the second section of the passage in the first valving element so that the head can be acted upon by pressurized flowable medium which is confined in the interior of the housing.

The first valving element can include an elongated open-ended tubular portion which defines the first section of the passage in the first valving element and which can constitute the metering pin. If the aforementioned threaded cap is omitted, the first valving element can constitute a one-piece tube. It is often preferred to use a two-piece first valving element which is assembled of two separable portions one of which is an elongated tube and the other of which is a screw cap in mesh with one end of the tube.

If the biasing means is or comprises a coil spring, such spring preferably surrounds the shank of the second valving element to react against the first valving element and to bear against the head of the second valving element.

The novel features which are considered as characteristic of the invention are set forth in particular in the appended claims. The improved valve assembly itself, however, both as to its construction and its mode of operation, together with additional features and advantages thereof, will be best understood upon perusal of the following detailed description of certain specific embodiments with reference to the accompanying drawing.

BRIEF DESCRIPTION OF THE DRAWING

FIG. 4 is a fragmentary partly elevational and partly vertical sectional view of the upper portion of a syphon which embodies a modified valve assembly;

FIG. 5 is an enlarged fragmentary sectional view of the valve assembly in the syphon of FIG. 4;

FIG. 6 is an axial sectional view of a portion of the dispensing valve and of a safety valve in a third valve assembly;

FIG. 7 is a similar sectional view of a fourth assembly whose valves are different from the valves in the assembly of FIG. 6; and FIG. 8 is a fragmentary axial sectional view of a valve assembly which constitutes a modification of the assembly shown in FIG. 7.

DESCRIPTION OF THE PREFERRED EMBODIMENTS

Figure 1:
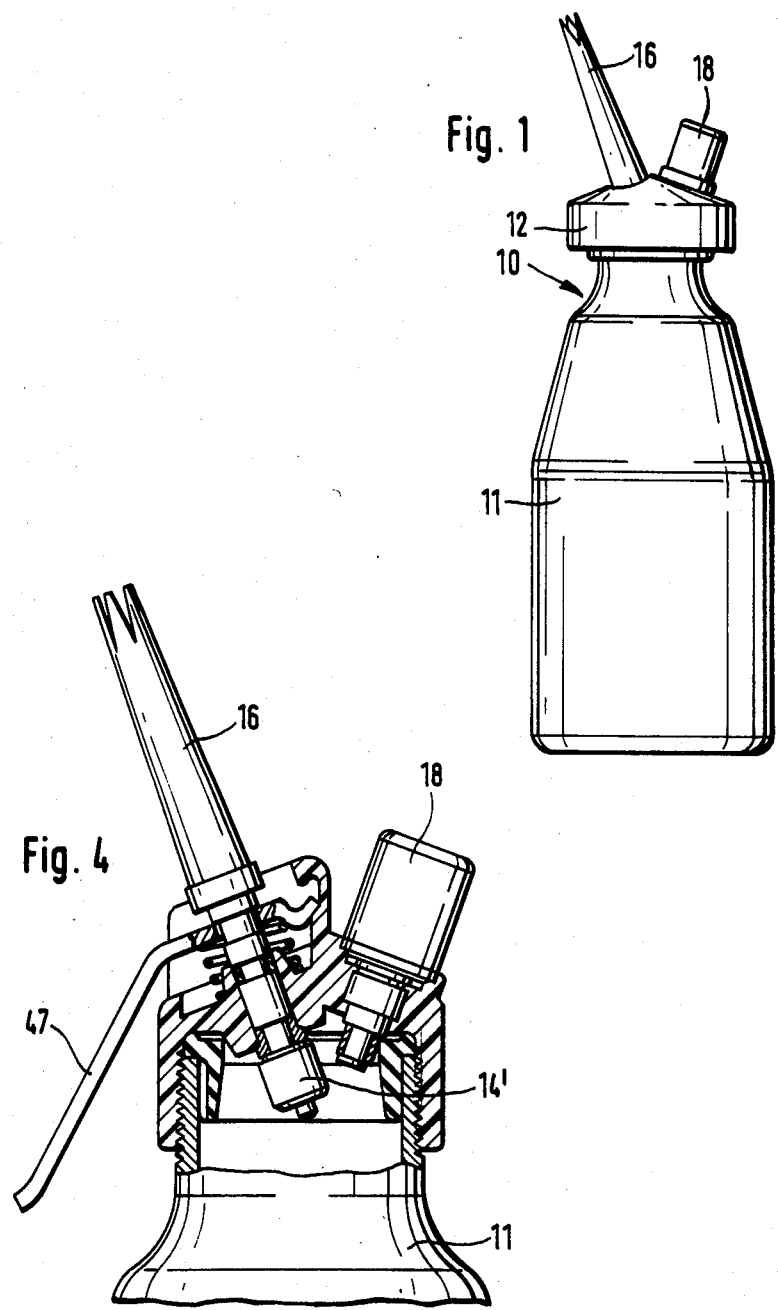
FIG. 1 is a somewhat schematic elevational view of a syphon utilizing a valve assembly which embodies one form of the present invention.
Figure 2:
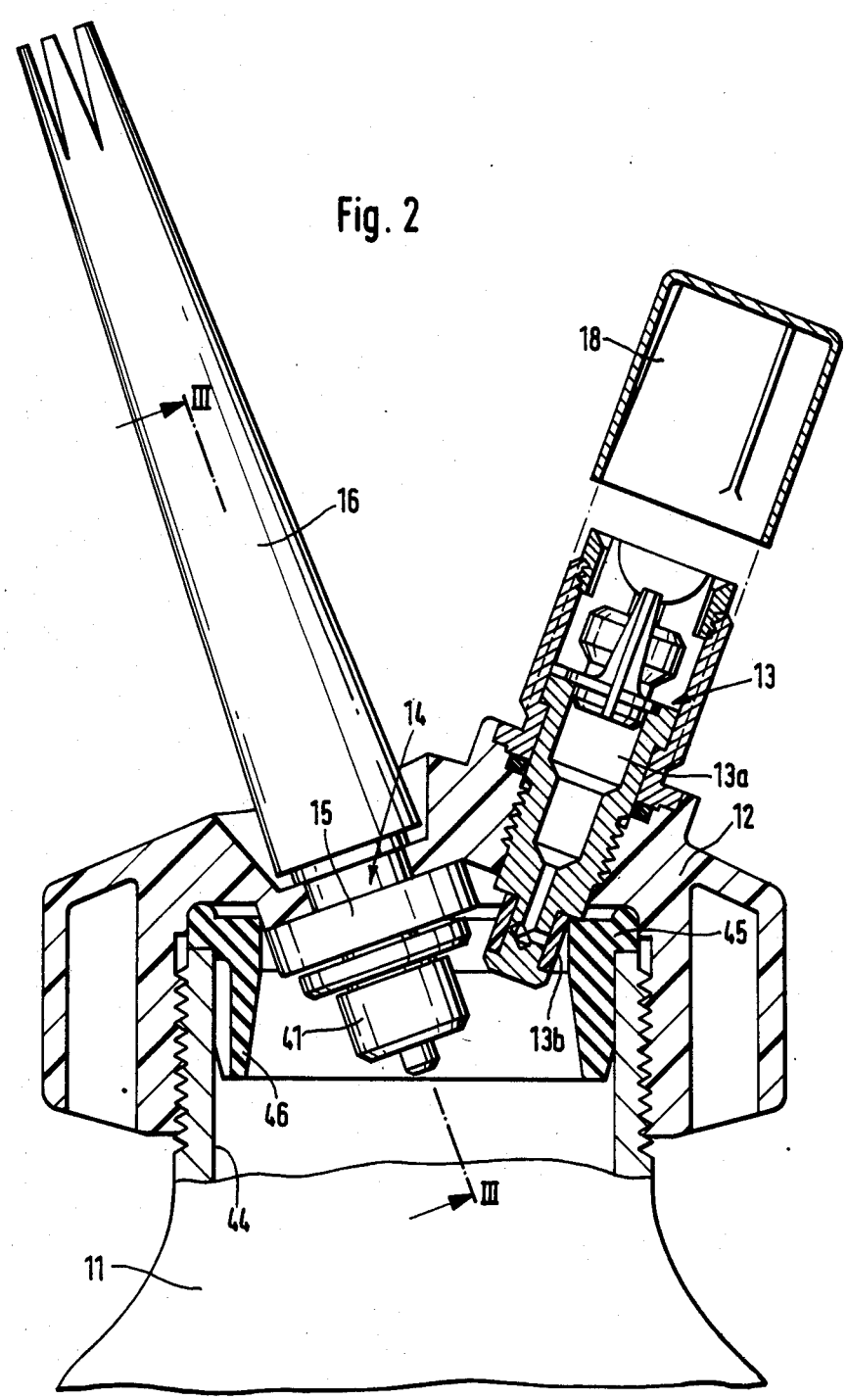
FIG. 2 is an enlarged partly elevational, partially vertical sectional and partially exploded view of the upper portion of the syphon which is shown in FIG. 1.
Figure 3:
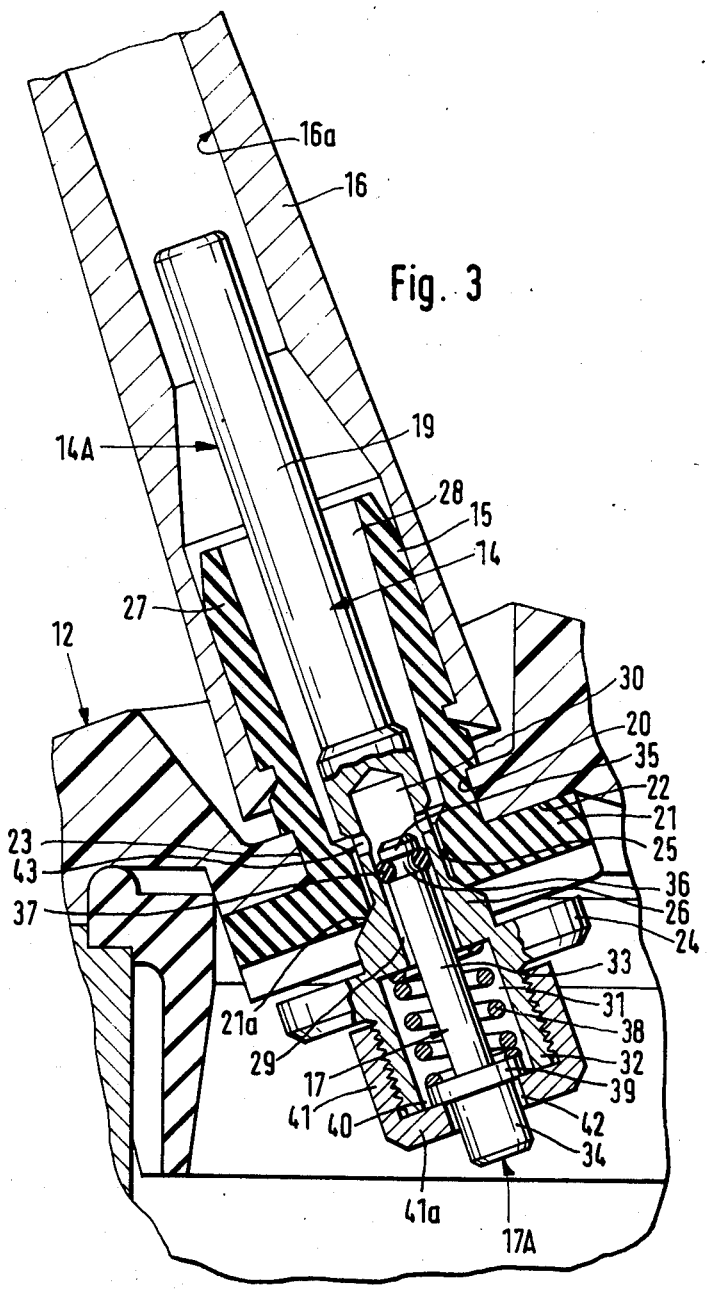
FIG. 3 is an enlarged fragmentary axial sectional view of the valve assembly which is shown in an elevational view in the upper left-hand portion of each of FIGS. 1 and 2, the section being taken in the direction of arrows as seen from the line III—III of FIG. 2.

FIGS. 1 to 3 show a syphon 10 comprising a vessel 11 (e.g., a bottle made of light metal) which serves to store a supply of a flowable medium (e.g., cream for use on or in pastry or for other purposes) and whose upper end portion or neck carries a detachable cover or cap 12 having an internal thread mating with the external thread of the vessel 11. The cover 12 can be made of a synthetic plastic material and carries a gas-admitting valve 13 as well as a novel and improved valve assembly including a normally closed dispensing valve 14 and a normally closed safety valve 17. The cover 12 constitutes the housing or body of the assembly including the safety valve 17 and the dispensing valve 14 and carries a deformable elastic lining 15 which can be said to constitute a detachable portion of the cover. The lining 15 carries a tubular displacing member 16 which normally spacedly surrounds an elongated portion 19 of the tiltable valving element 14A of the dispensing valve 14.

The vessel 11 is filled with a flowable medium (e.g., cream) while the cover 12 is detached therefrom. The cover 12 is thereupon screwed onto the neck of the vessel 11 to deform an annular sealing member 45 into sealing engagement with the upper end face of the neck of the vessel 11 as well as with the adjacent internal surface of the cover to thus prevent uncontrolled escape of the confined medium by way of the neck of the vessel 11. In the next step, a customary capsule (not shown) which contains a supply of suitable compressed gaseous fluid is inserted into its receptacle (not shown) before the receptacle is threadedly connected to the upper portion of the gas-admitting valve 13. A pin or another suitable piercing tool which is installed in the valve 13 automatically penetrates through a membrane of the capsule while the receptacle is being screwed onto the body of the valve 13 so that the thus liberated gaseous fluid can flow through the channel 13a and expand a sleeve-like elastic valving element 13b in order to establish a path for penetration into the interior of the vessel 11. The valving element 13b automatically prevents return flow of gaseous fluid and/or penetration of cream from the vessel 11 into the body of the valve 13. The gaseous fluid can contain nitrous oxide. The cream is foamed in part during introduction into the vessel 11 and in part as a result of admission of gaseous fluid by way of the valve 13. Moreover, the cream is pressurized so that it tends to escape from the interior of the vessel 11 and is free to escape in response to manipulation of the tubular displacing member 16, i.e., in response to partial or full opening of the dispensing valve 14. A protective cap 18 is preferably provided to confine and surround the gas-admitting valve 13 when the syphon 10 is not in actual use. The cap 18 can have one or more internal ribs which come into frictional engagement with the external thread of the body of the gas-admitting valve 13.

The elongated portion 19 of the valving element 14A of the dispensing valve 14 can be tilted by the tubular displacing member 16 to effect a partial or full opening of the valve 14 whereby the pressurized cream is free to escape from the vessel 11 and to issue from the syphon 10 by way of the discharge end of the displacing member 16. The elongated portion 19 can be said to constitute a metering pin and is the larger part of the valving element 14A of the dispensing valve 14. This valving element further includes an internally threaded cup-shaped second portion 41 mating with the externally threaded end portion 32 of the tubular portion 19. The bottom end wall 41a of the cup-shaped second portion 41 defines a seat for the enlarged head 39 of a second valving element 17A which is a part of the safety valve 17 and which further includes a shank 33.

The cover or housing 12 has a bore or hole 20 which receives an intermediate portion of the deformable lining 15. The latter is made of rubber or another suitable elastomeric material and includes a tubular portion 27 located outwardly of and a disc-shaped portion 21 located inwardly of the hole 20. The disc-shaped portion 21 is in sealing contact with the adjacent portion of the internal surface 22 of the cover 12, and the tubular portion 27 is in sealing engagement with the lower end portion of the displacing member 16, as viewed in FIG. 3. As can also be seen in FIG. 3, the lower end portion of the displacing member 16 can have an internal circumferentially extending rib which snaps into an external groove of the tubular portion 27 to reliably couple the lining 15 with the displacing member. When the displacing member 16 is caused to change its orientation relative to the cover or housing 12, its internal surface engages and tilts the elongated portion 19 of the valving element 14A of the dispensing valve 14 so that the conical portion 26 of the valving element 14A is partially or completely disengaged from a complementary seat 21a which is defined by the disc-shaped portion 21 of the lining 15. The seat 21a defines a path which allows for escape of the pressurized cream from the interior of the vessel 11, through the internal passage 28 of the tubular portion 27 and into the interior of the displacing member 16. The discharge end of the displacing member 16 can direct the stream of foamed cream against selected portions of a piece of pastry or the like.

That portion of the housing or cover 12 which surrounds the bore or hole 20 can be said to constitute a male detent member which snaps into the complementary circumferential groove of the lining 15 between the tubular portion 27 and the disc-shaped portion 21 to thus ensure the establishment of a satisfactory seal along the surface 23 which surrounds the hole 20. The pressurized cream which is confined in the vessel 11 acts upon the outer side of the bottom wall 41a of the cup-shaped portion 41 as well as upon the underside of a collar 24 on the valving element 14A of the dispensing valve 14 to ensure that such valving element normally bears against the seat 21a and permits escape of a selected quantity of cream only when the operator intentionally changes the orientation of the tubular displacing member 16 and of the elongated portion or metering pin 19 therewithin. The elasticity of the lining 15 allows for tilting of the displacing member 16 to any one of a practically infinite number of different positions relative to the cover or housing 12.

The elongated portion 19 of the valving element 14A of the dispensing valve 14 defines an axially extehding medium-discharging passage 29 which includes a smaller-diameter first section 30 and a larger-diameter second section 31. The latter is adjacent to the opening 40 in the inner end of the elongated portion 19 of the valving element 14A of the dispensing valve 14. The valving element 17A of the safety valve 17 includes the aforementioned shank 33 which extends into the smaller-diameter section 30 of the passage 29 and has a circumferential groove 36 for a portion of an annular seal 37 engaging the surface 25 surrounding the section 30. The valving element 17A of the safety valve 17 further includes the head 39 which normally engages the inner side of the bottom wall 41a of the cup-shaped portion 41 to seal the opening 42 and to thus prevent the escape of pressurized cream into the passage 29 and thence into the internal passage 28 of the lining 15 by way of radially disposed ports 43 in the valving element 14A of the dispensing valve 14. The safety valve 17 further comprises a coil spring 38 which surrounds the shank 33 to react against a shoulder between the sections 30, 31 of the passage 29 and to bear against the head 39 which is thereby held in sealing engagement with the bottom wall 41a of the cup-shaped portion 41. The head 39 has a protuberance 34 which extends with clearance through an opening 42 of the bottom wall 41a and into the interior of the neck of the vessel 11 so that it can be acted upon by the confined pressurized cream and in order to lift the head 39 off its seat (bottom wall 41a) when the pressure in the interior of the vessel 11 reaches a predetermined maximum acceptable value. The coil spring 38 is confined in the larger-diameter section 31 of the passage 29 in the valving element 14A of the dispensing valve 14. The opening 40 at the inner end of the passage 29 is sealed in part by the cup-shaped portion 41 and in part by the head 39 when the safety valve 17 is operative to prevent the escape of confined cream by way of the passage 29, ports 43 and passage 28. The bias of the coil spring 38 can be readily selected in such a way that the safety valve 17 opens automatically when the pressure in the interior of the vessel 11 reaches a predetermined threshold value.

FIG. 2 shows that the sealing member 45 between the vessel 11 and the cover 12 has a sleeve-like lip 46 which is spaced apart from the internal surface 44 of the neck of the vessel 11. The cup-shaped portion 41 of the valving element 14A of the dispensing valve 14 extends into the space which is surrounded by the lip 46.

The shank 33 of the valving element 17A of the safety valve 17 has a cylindrical outer end portion 35 which is adjacent to the annular seal 37 and to the radial ports 43. When the safety valve 17 is open, the seal 37 allows foamed cream to flow from the section 30 of the passage 29 into the passage 28 by way of the ports 43.

FIGS. 4 and 5 illustrate a second valve assembly wherein the lining 15 is omitted and the valving element 14B of the dispensing valve 14' is reciprocable rather than pivotable or tiltable with reference to the seat 21b. The valving element 14B of the valve 14' has a deformable collar 49 which normally engages the seat 21b due to the pressure of the medium which is confined in the vessel 11 and acts upon the cup-shaped portion 41 as well as under the action of a prestressed coil spring 48 which reacts against the outer side of the cover or housing 12B and bears against a handle or lever 47 which is pivotably mounted on the cover 12B and can be pivoted by hand (in the direction of arrow A) in order to shift the valving element 14B of the valve 14' axially and to thus allow the compressed medium to issue from the vessel 11 along the path which is defined by the seat 21b. In this embodiment of the improved valve assembly, the elongated open-ended tubular portion 19B of the valving element 14B of the dispensing valve 14 again acts not unlike a metering pin except that it must be shifted axially rather than pivoted in order to disengage the elastic collar 49 from the seat 21b. The tubular portion 19B of the valving element 14B of the valve 14' defines a passage 51 which can receive the flowable medium from the hole or bore 20 in the cover 12B when the elastic collar 49 is disengaged from its seat 21b.

Radial ports 50 are provided in the tubular portion 19B of the valving element 14B of the valve 14' to allow the flowable medium to enter the passage 51 when the dispensing valve 14' is open. The passage 51 can further receive flowable medium in response to opening of the safety valve 17, namely when the medium in the vessel 11 displaces the protuberance 34 axially so that the annular seal 37 reaches the level of the ports 50 and permits the medium to flow from the passage 29 into the passage 51. The reference character 52 denotes a nut which is adjacent to the tubular member 16 and mates with the adjacent end of the tubular portion 19B of the valving element 14B of the valve 14' to provide an abutment for the neighboring portion of the handle 47. The nut 52 is integral with a nipple 53 which is received in the adjacent end portion of the tubular member 16.

The construction and mode of operation of the safety valve 17 are identical to those of the safety valve 17 which is shown in FIG. 3 and the parts of the valve 17 which is shown in FIG. 5 are denoted by the same reference characters as those used in FIG. 3. This also applies for the sections 30 and 31 of the passage 29 with the sole exception that the section 30 constitutes the innermost part of the passage 51 in the open-ended tubular portion 19B of the valving element 14B.

FIG. 6 shows a portion of a third valve assembly whose housing (not shown) is identical with the cover 12 of FIGS. 1 to 3. The difference between the safety valve 17 of FIGS. 1 to 3 and the safety valve 17' of FIG. 6 is that the valving element 17C of the valve 17' has a shank 33C with a conical (preferably frustoconical) outer end portion 35C. The valving element 14C of the dispensing valve 14'' includes an open-ended elongated tubular portion or metering pin 19C and a cup-shaped portion 41. The safety valve 17' begins to admit compressed flowable medium from the section 30 of the passage 29 into the larger-diameter passage 19c of the open-ended tubular portion 19C (and thence into the non-illustrated displacing member 16) as soon as the annular seal 37 moves upwardly (as viewed in FIG. 6) and beyond the annular shoulder 19s between the section 30 and the passage 19c.

All other parts of the assembly which is shown in FIG. 6 are denoted by the same reference characters as those used in FIGS. 1 to 3.

The conical end portion 35C simplifies the installation of the valving element 17C in the valving element 14C. The omission of radial ports (see the ports 43 in FIG. 3) simplifies the making of the valving element 14C.

FIG. 7 shows a portion of a fourth valve assembly wherein the entire valving element 14D of the dispensing valve 14''' constitutes a one-piece open-ended tube, i.e., the valving element 14D does not have an internally threaded cup-shaped portion corresponding to the portion 41 shown in FIG. 6. The construction of the valving element 17D of the safety valve 17'' is modified in that the head 39D does not have a smaller-diameter protuberance 34 and also in that the expelling action of the coil spring 38 is opposed solely by friction between the annular seal 37 and the internal surface of the valving element 14D in the smaller-diameter portion of the passage 19d (i.e., at a level below the shoulder 19s, as viewed in FIG. 7). It has been found that such friction normally suffices to hold the valve 17'' in closed position. The shape of the outer end portion 35D of the shank 33 of the valving element 17D is the same as that of the end portion 35C shown in FIG. 6.

Referring to FIG. 8, there is shown a portion of an additional valve assembly having a dispensing valve whose valving element 14E is substantially identical with that of the dispensing valve 14' in FIGS. 4–5 and wherein the valving element 17D of the safety valve is identical with the similarly referenced valving element of FIG. 7. The only difference is that the valving element 14E does not comprise an internally threaded cup-shaped portion corresponding to the portion 41 of FIG. 5.

The improved valve assembly can be modified in a number of additional ways without departing from the spirit of the invention. For example, the configuration of the valving element of the safety valve, of the valving element of the dispensing valve, of the housing for the valve assembly and/or of the displacing means for the valving element of the dispensing valve can depart from those which are actually shown in the drawing. Furthermore, a device which embodies the improved valve assembly can be used for a number of additional purposes; for example, it can constitute a container for whipped cream, a means for preparing cream, a blower for cream or the like.

An important advantage of the improved valve assembly is its compactness, its simplicity and its reasonable cost. In addition, and in spite of the compactness of such valve assembly, the valving element of the safety valve does not interfere with the operation of the dispensing valve or vice versa. The valving element of the dispensing valve shields and protects the safety valve, and the entire valve assembly can be installed in the cover of an existing syphon or the like as a superior substitute for heretofore known valve assemblies with combined or discrete dispensing and safety valves.

The annular seal 37 exhibits the advantage that it reliably guides the shank of the valving element of the safety valve during reciprocatory movements of such valving element between at least one first position in which the valving element cooperates with the seat of the valving element of the dispensing valve to prevent the escape of confined flowable medium through the passage in the valving element of the dispensing valve, and at least one second position in which the valving element of the safety valve permits the confined medium to escape as soon as the pressure of such medium exceeds a preselected threshold value. Reliable guidance of the shank of the valving element of the safety valve is an important prerequisite for predictable operation of the safety valve.

It is presently preferred to employ a dispensing valve whose valving element has an internally threaded cup-shaped portion 41 because the portion 41 reliably confines the head of the valving element of the safety valve in the larger-diameter section 31 of the passage in the valving element of the dispensing valve even if the syphon or another device embodying the improved valve assembly is caused to perform rapidly recurring regular or irregular movements, such as shaking, in order to agitate the contents of the vessel or for any other reason.

The provision of a passage in the elongated portion of the valving element of the dispensing valve is desirable and advantageous because such valving element need not be provided with radial ports or the like for admission of confined flowable medium from the smaller-diameter portion of the passage in such valving element into the tubular displacing member.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of our contribution to the art and, therefore, such adaptations should and are intended to be comprehended within the meaning and range of equivalence of the appended claims.

We claim:

1. A dispensing and safety valve assembly, particularly for use in syphons for controlled dispensing of pressurized cream and other flowable media, comprising a housing arranged to confine a supply of pressurized medium and having a first seat which defines a path for evacuation of the confined medium; a first valving element normally engaging said seat to prevent the escape of the confined medium and having a medium-discharging passage including a first and a second section, said valving element having a second seat and an internal surface surrounding said second section; means for displacing said valving element relative to said first seat to thus permit the escape of confined medium from the housing along said path; a second valving element movably installed in said first valving element and including a shank extending into said first section and being guided by said first valving element, and a head in said second section; and biasing means provided in said second section to yieldably urge said head to at least one first position in which said second valving element sealingly engages said second seat to thus prevent the escape of the confined medium by way of said passage, said shank including a portion in sealing contact with said internal surface, at least while said second valving element engages said second seat, said head being displaceable by the confined medium against the opposition of said biasing means when the pressure of the confined medium exceeds a predetermined value so that the second valving element assumes a second position in which the medium can escape from said housing by way of said passage.

2. The assembly of claim 1, wherein one of said sections is larger than the other of said sections.

3. The assembly of claim 1, wherein said first valving element is reciprocable with reference to said housing toward and away from engagement with said first seat and said displacing means includes a handle which is actuatable to move said first valving element away from engagement with said first seat.

4. The assembly of claim 1, wherein said first a valving element is tiltable into and from engagement with said first seat and said displacing means comprises a tubular member defining a second passage in communication with said path and being actuatable to tilt said first valving element away from engagement with said first seat.

5. The assembly of claim 4, wherein said first valving element has an elongated portion extending into said tubular member.

6. The assembly of claim 1, wherein said shank has a conical end portion remote from said head.

7. The assembly of claim 1, wherein said first valving element includes a detachable portion which defines said second seat.

8. The assembly of claim 7, wherein said detachable portion includes a threaded cap which includes a portion arranged to confine at least a portion of said head in the second section of said passage.

9. The assembly of claim 1, wherein said first valving element includes an open-ended elongated tubular portion defining the first section of said passage.

10. The assembly of claim 1, wherein said first valving element is reciprocable in said housing into and from engagement with said first seat.

11. The assembly of claim 1, wherein said first valving element comprises two separable portions one of which defines said passage and the other of which defines said second seat.

12. The assembly of claim 1, wherein said housing constitutes or forms part of the detachable cover of a syphon.

13. The assembly of claim 1, wherein said biasing means comprises a coil spring which surrounds said shank which reacts against said first valving element and which bears against said head.

14. A dispensing and safety valve assembly, particularly for use in syphons for controlled dispensing of pressurized cream and other flowable media, comprising a housing arranged to confine a supply of pressurized medium and having a first seat which defines a path for evacuation of the confined medium; a first valving element normally engaging said seat to prevent the escape of the confined medium and having a medium-discharging passage including a first and a second section, said valving element having a second seat; means for displacing said valving element relative to said first seat to thus permit the escape of confined medium from the housing along said path; a second valving element movable installed in said first valving element and including a shank extending into said first section and being guided by said first valving element, and a head in said second section; and biasing means provided in said second section to yieldably urge and head to at least one first position in which said second valving element sealingly engages said second seat to thus prevent the escape of the confined medium by way of said passage, said shank havng a circumferential groove and said second valving element further comprising an annular seal extending into said groove and contacting said first valving element in said first section, at least while said second valving element engages said second seat, said head being displaceable by the confined medium against the opposition of said biasing means when the pressure of the confined medium exceeds a predetermined value so that the second valving element assumes a second position in which the medium can escape from said housing by way of said passage.

* * * * *